(12) United States Patent
Zhang et al.

(10) Patent No.: US 11,095,185 B2
(45) Date of Patent: Aug. 17, 2021

(54) MOTOR ASSEMBLY (71) Applicant: Johnson Electric International AG, Murten (CH)

(72) Inventors: Hongwei Zhang, Hong Kong (HK); Lingdong Jin, Hong Kong (HK); Fosheng Zou, Hong Kong (HK)

(73) Assignee: Johnson Electric International AG, Murten (CH)

( * ) Notice: Subject to any disclaimer, the term of this patent is extended or adjusted under 35 U.S.C. 154(b) by 120 days.

(21) Appl. No.: 16/168,822

(22) Filed: Oct. 23, 2018

(65) Prior Publication Data

US 2019/0123610 A1  Apr. 25, 2019

(30) Foreign Application Priority Data

Oct. 25, 2017 (CN) .......................... 201711016439.3

(51) Int. Cl.
| | |
|---|---|
| *H02K 5/22* | (2006.01) |
| *H02K 5/15* | (2006.01) |
| *H02K 11/026* | (2016.01) |
| *H02K 5/173* | (2006.01) |
| *H02K 5/14* | (2006.01) |
| *H02K 5/08* | (2006.01) |
| *H02K 11/215* | (2016.01) |

(52) U.S. Cl.
CPC ................. *H02K 5/15* (2013.01); *H02K 5/08* (2013.01); *H02K 5/145* (2013.01); *H02K 5/148* (2013.01); *H02K 5/1732* (2013.01); *H02K 11/026* (2013.01); *H02K 5/225* (2013.01); *H02K 11/215* (2016.01); *H02K 2203/03* (2013.01)

(58) Field of Classification Search
CPC ............ H02K 5/08; H02K 5/14–5/148; H02K 5/225; H02K 11/026
See application file for complete search history.

(56) References Cited

U.S. PATENT DOCUMENTS

| | | | |
|---|---|---|---|
| 10,454,231 B2 * | 10/2019 | Bruhn .................... | H02K 5/148 |
| 2007/0252454 A1 * | 11/2007 | Hayashi ................. | H02K 3/522 |
| | | | 310/71 |
| 2012/0175980 A1 | 7/2012 | Zhang et al. | |
| 2018/0219450 A1 * | 8/2018 | Yamamoto ............. | H02K 11/33 |

FOREIGN PATENT DOCUMENTS

| | | |
|---|---|---|
| CN | 1114792 A | 1/1996 |
| CN | 102593997 A | 7/2012 |
| CN | 102593997 B | 8/2016 |
| EP | 0655822 A1 | 5/1995 |

\* cited by examiner

*Primary Examiner* — Ramon M Barrera (57) ABSTRACT

A motor assembly is provided, which includes a motor having a stator and a rotor rotatable relative to the stator, and a filter unit mounted to an outside of the motor. The filter unit includes an insulating housing and at least one filter element arranged in the housing and electrically connected to the motor.

14 Claims, 8 Drawing Sheets

MOTOR ASSEMBLY

CROSS REFERENCE TO RELATED APPLICATIONS

This non-provisional patent application claims priority under 35 U.S.C. § 119(a) from Patent Application No. 201711016439.3 filed in the People's Republic of China on Oct. 25, 2017.

FIELD OF THE DISCLOSURE

This present disclosure relates to a motor assembly.

BACKGROUND OF THE DISCLOSURE

Chinese patent publication number CN102593997B discloses a typical motor assembly. A stator of the motor assembly includes a stator housing and an end cap. The end cap includes an end cap housing and a connector housing which are integrally formed as one piece. The end cap housing is substantially in the form of a hollow cylinder and mounted to an open end of the stator housing. A support plate is integrally formed in the end cap housing to divide an interior space thereof into a first cavity facing the stator housing, and a second cavity remote from the stator housing. A bearing is mounted to the support plate to support a shaft of a rotor of the motor assembly. The first cavity is mounted with two brushes for transmitting a power to the rotor and a plurality of filter elements, such as inductors or capacitors. The second cavity is mounted with a circuit board having a hall sensor for detecting the rotation of the shaft. The connector housing is arranged at one side of the end cap housing, and has a plurality of terminals respectively connected to the circuit board and the brushes.

However, the end cap is difficult to meet different customers' demands, because the different customers may have different requirements on the electromagnetic compatibility level of the motor assembly. It is often necessary to customize the corresponding end caps for different customers. In addition, the end cap is complicated due to the installation of many electrical components, customizing different end caps will greatly increase the production cost.

SUMMARY

Thus, there is a desire for a motor assembly more flexible to meet the needs of different customers.

According to one aspect, a motor assembly is provided which includes a motor having a stator and a rotor rotatable relative to the stator, and a filter unit mounted to an outside of the motor. The filter unit includes an insulating housing and at least one filter element arranged in the insulating housing and electrically connected to the motor.

According to another aspect, another motor assembly is provided, which includes a stator with a stator housing and an end cap mounted to an outside of the stator housing, and a rotor rotatable relative to the stator. The end cap includes an end cap housing, a connector housing connected with the end cap housing and at least having two power terminals for connecting an external power source, at least two brushes and at least one filter element arranged inside the end cap housing. The end cap further comprises a metal casing which covers one axial end of the end cap housing and substantially surrounds a peripheral surface of the end cap housing.

In embodiments of the present disclosure, the motor and the filter unit are separate, so the filter unit can be selectively mounted to the motor or not according to the demands of the different customers on the electromagnetic compatibility level of the motor assembly. Besides, the filter unit has a simply structure as it has less components than the current end cap, the production cost of customizing different filter units will be lower than the production cost of customizing different current end cap. Therefore, the motor assembly of the present disclosure is more flexible to meet the needs of different customers.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 1:
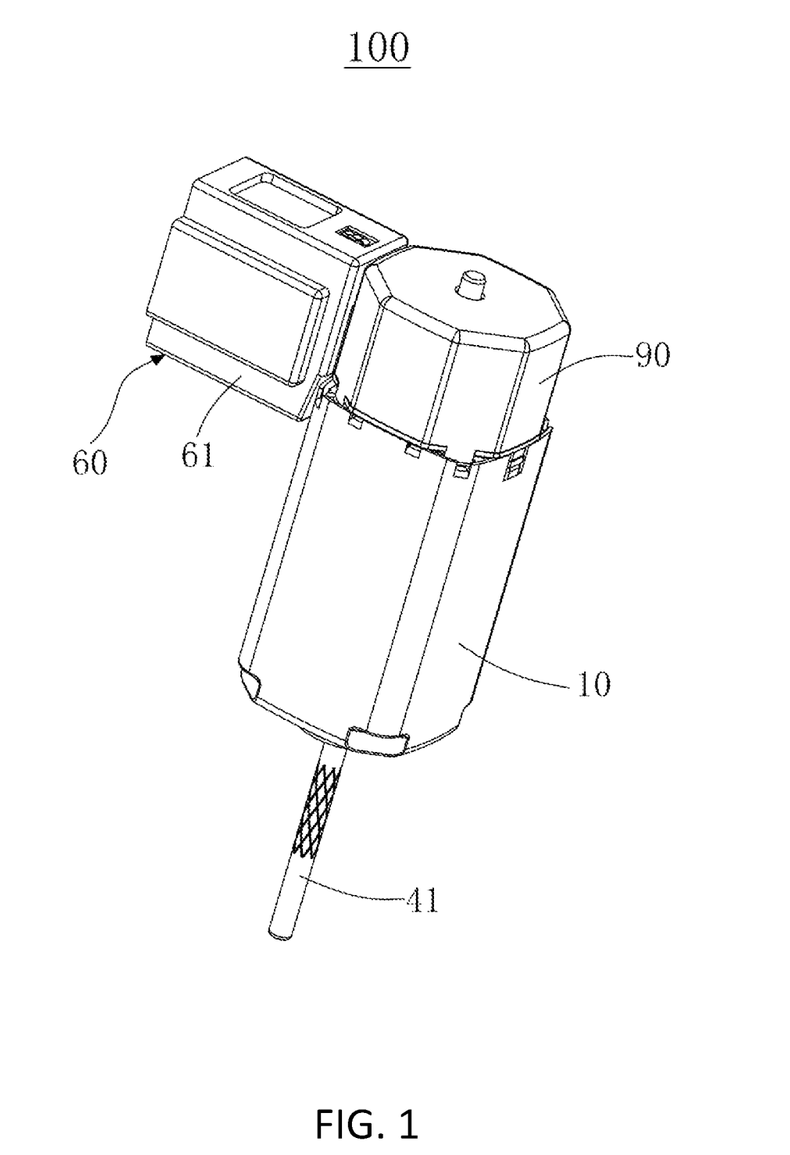
FIG. 1 is a perspective view of a motor assembly according to a preferred embodiment of the present disclosure.

Referring to FIG. 1, a motor assembly 100 of the present disclosure is particular applied to a waist massager, a lumbar support or a headrest of a motor vehicle. The motor assembly 100 includes a motor 10 and a connector 60 mounted to an outside of the motor 10.

Figure 2:
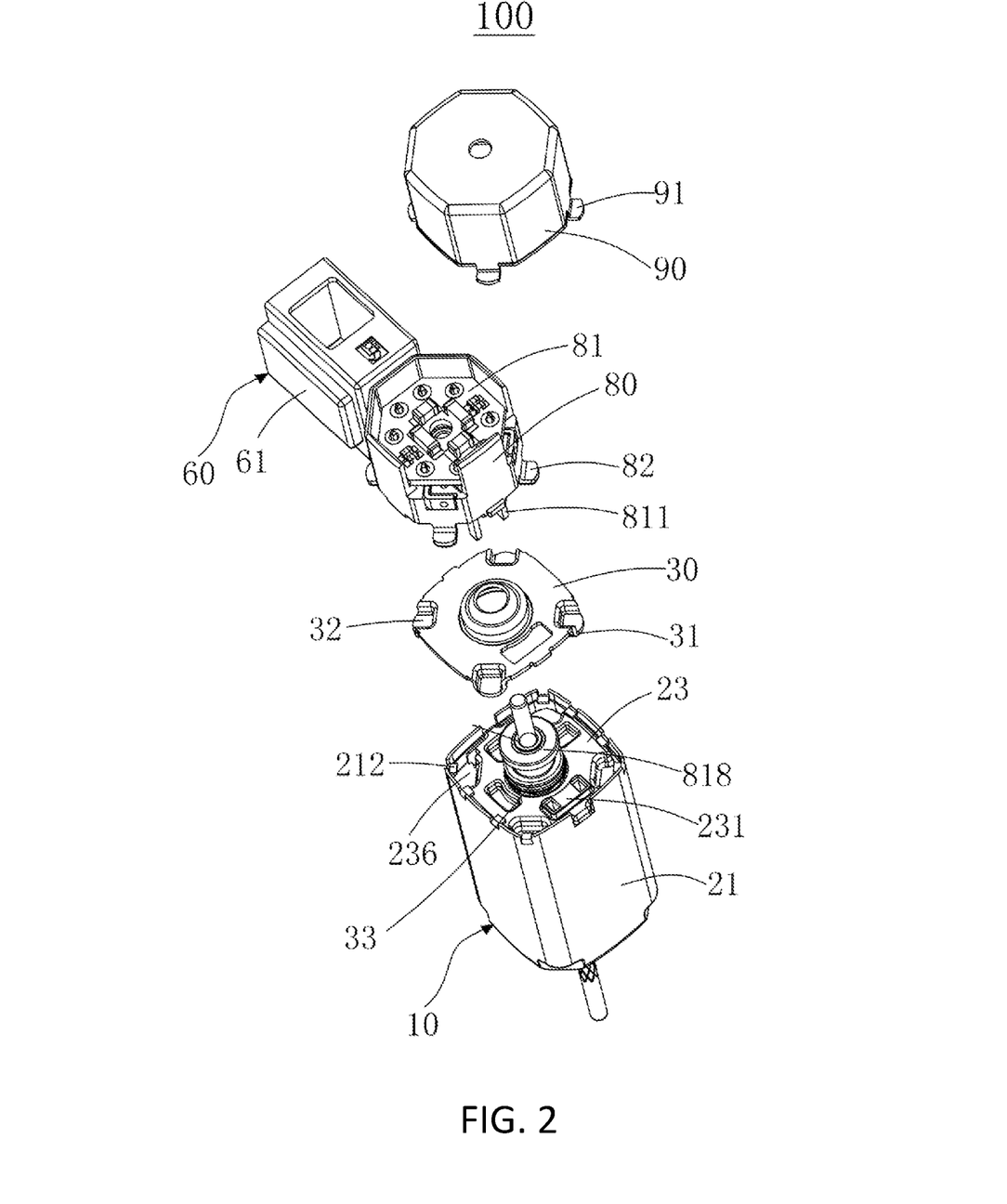
FIG. 2 is a partially exploded view of the motor assembly of FIG. 1.
Figure 3:
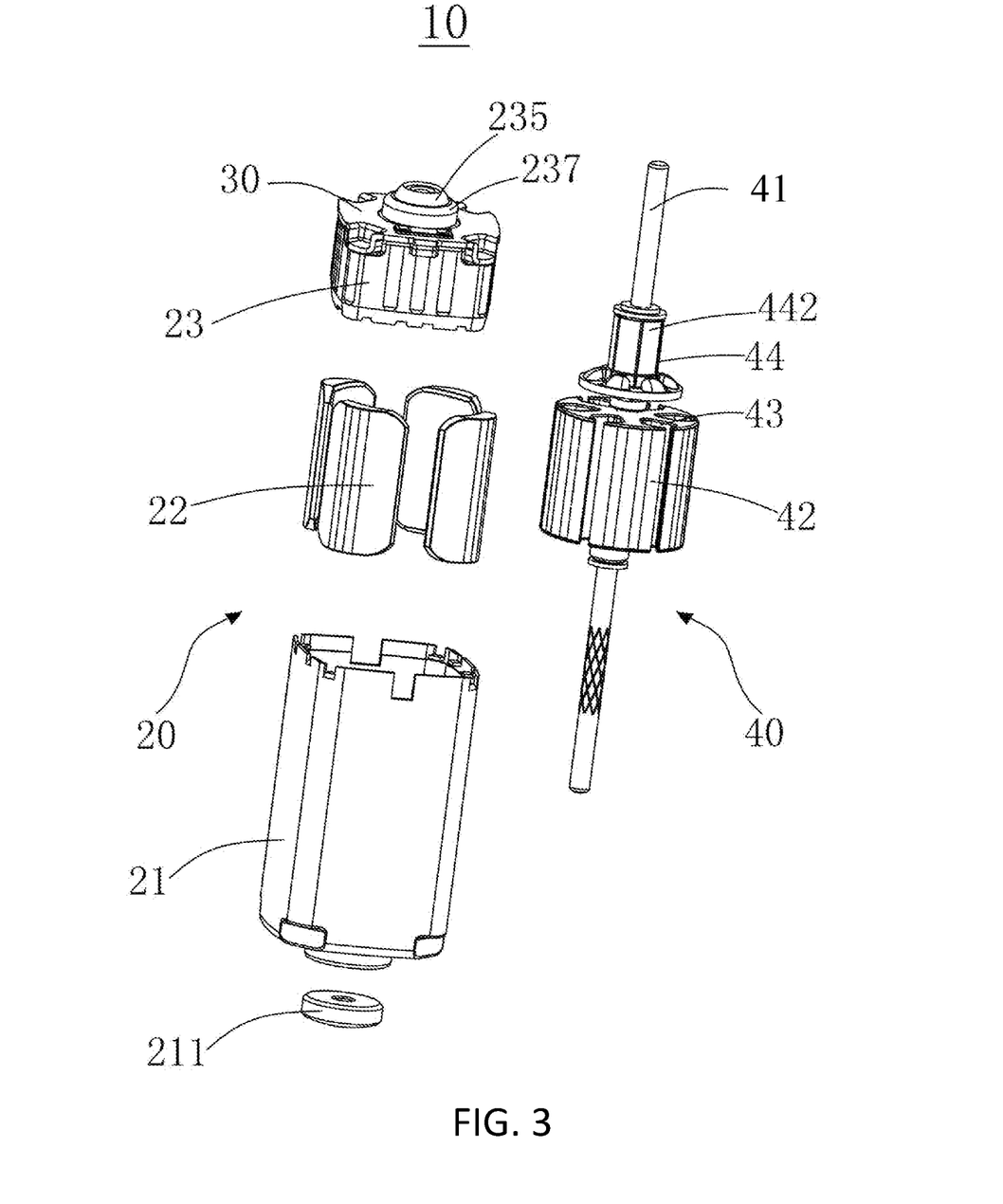
FIG. 3 is an exploded view of a motor of the motor assembly of FIG. 1.

Referring to FIGS. 2 to 3, the motor 10 includes a stator 20 and a rotor 40 rotatable relative to the stator 20. The rotor 40 is arranged inside the stator 20 and has a shaft 41 protruding outside the stator 20. The stator 20 includes a stator housing 21, at least one permanent 22 mounted to an inner wall of the stator housing 21, an end cap 23, and a metal cover 30. In the embodiment, the stator housing 21 has an open end and a closed end. The end cap 23 and the metal cover 30 are mounted to the open end of the stator housing 21. The metal cover 30 is mounted to an outer side of the end cap 23. The end cap 23 is arranged into a space formed by the stator housing 21 and the metal cover 30. The cross section of the stator housing 21 may be substantially quadrate. Preferably, the end cap 23 and the metal cover 30 have a cross section substantially corresponding to the stator housing 21, and are housed into the stator housing 21.

The rotor 40 includes a shaft 41, a rotor core 42 fixed to the shaft 41, a commutator 44 with a plurality of commutator segments 442, a rotor winding (not shown) wound around the rotor core 42 and connected to the commutator segments 442 of the commutator 44. The rotor core 42 is provided with an insulating bobbin 43.

The rotor core 42 and the commutator 44 are housed in the stator housing 21. The commutator 44 is adjacent to the brushes 24 to ensure a sliding contact between the brushes 24 and the commutator segments 442. An air gap is defined between an outer circumference of the rotor 40 and the permanent magnet 22 to facilitate a rotation of the rotor 40 relative to the stator 20.

The shaft 41 is supported by a bearing 211 mounted to the closed end of the stator housing 21 and a bearing 235 mounted to the metal cover 30 or the end cap 23. One end of the shaft 41 extends to an outside of the stator housing 21 for driving, the other end of the shaft 41 may extend through the connector 60 and the metal casing 90 to an outside of the metal casing 90.

Referring to FIGS. 4 to 7, the end cap 23 includes an insulating body (not labelled), a female socket 231 and at least one pair of brush holders 25 formed in the insulating body, and at least one pair of brushes 24 respectively arranged in the corresponding brush holders 25. The female socket 231 includes at least two insertion holes 233 to allow insertion of an external male plug 811 therethrough. The metal cover 30 has a through hole (not labelled) corresponding to the insertion holes 233 to allow passage of the male plug 811 therethrough. At least two first terminals 234 are respectively fixed to the corresponding insertion holes 233. In the embodiment, the first terminal 234 includes two arms 234a. At least one arm 234a is elastic and cooperate with the other arm 234a to form a structure capable of clamping a corresponding terminal 811a of the male plug 811. In an alternative embodiment, the first terminal 234 may have only one arm, as long as it can be in contact with the corresponding terminal 811a. Besides, one arm 234a has a connection portion 234b configured to be connected to the corresponding brush 24 via a conductor 238 mounted to the end cap 23.

Figure 4:
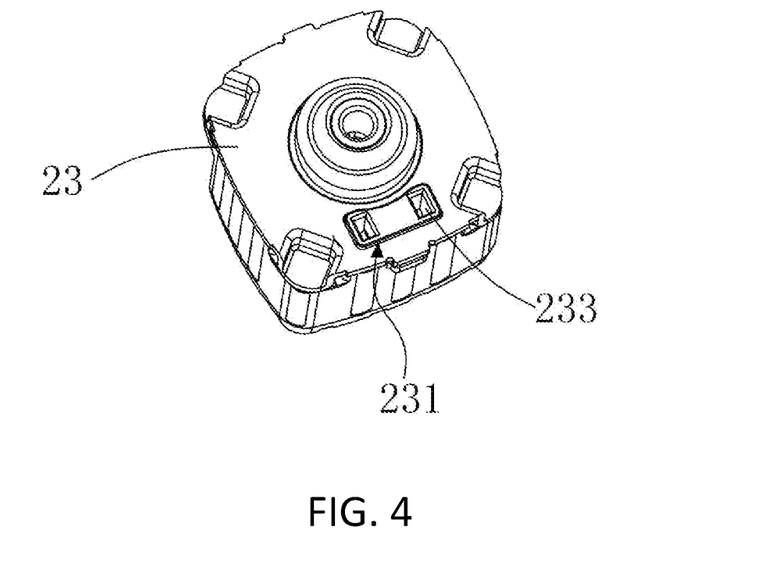
FIG. 4 is a perspective view of an end cap of the motor of FIG. 3.
Figure 5:
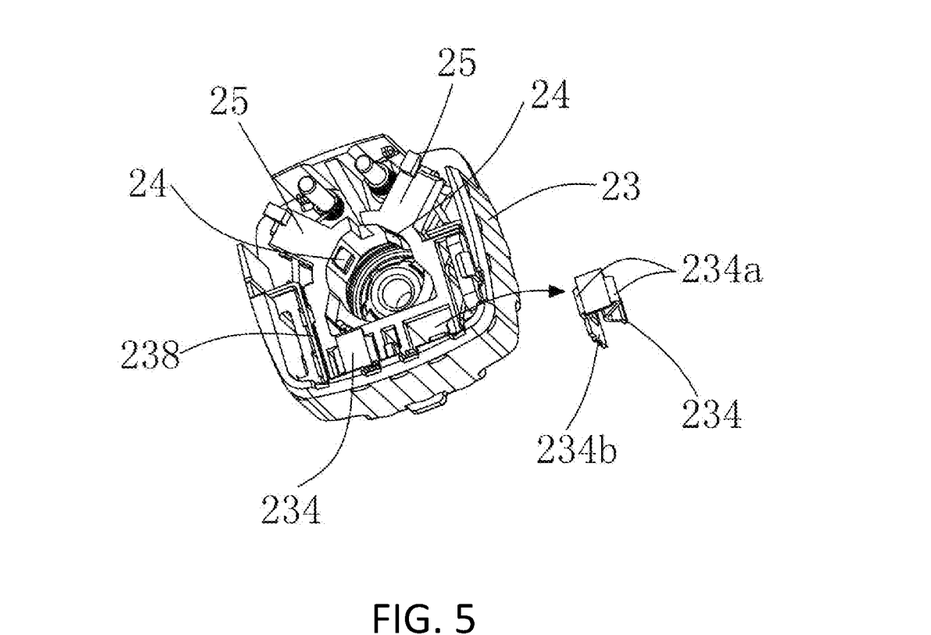
FIG. 5 is a perspective view of the end cap of FIG. 4 from another view.
Figure 6:
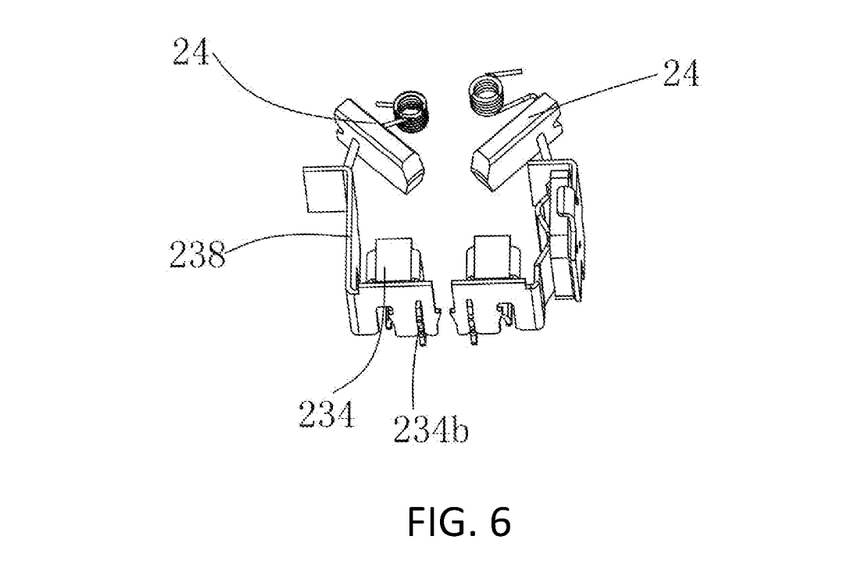
FIG. 6 illustrates connections of electrical components fixed inside the end cap of FIG. 5.

In the embodiment, the brush holders 25 and the brushes 24 are two in number. The two brushes 24 are arranged along a radial direction of the end cap 23, with an angle formed therebetween. The angle is substantially 90 degrees. The brushes 24 and the female socket 231 are arranged at opposite sides of the shaft 41. The female socket 231 may be substantially corresponding to the brushes 24.

Figure 7:
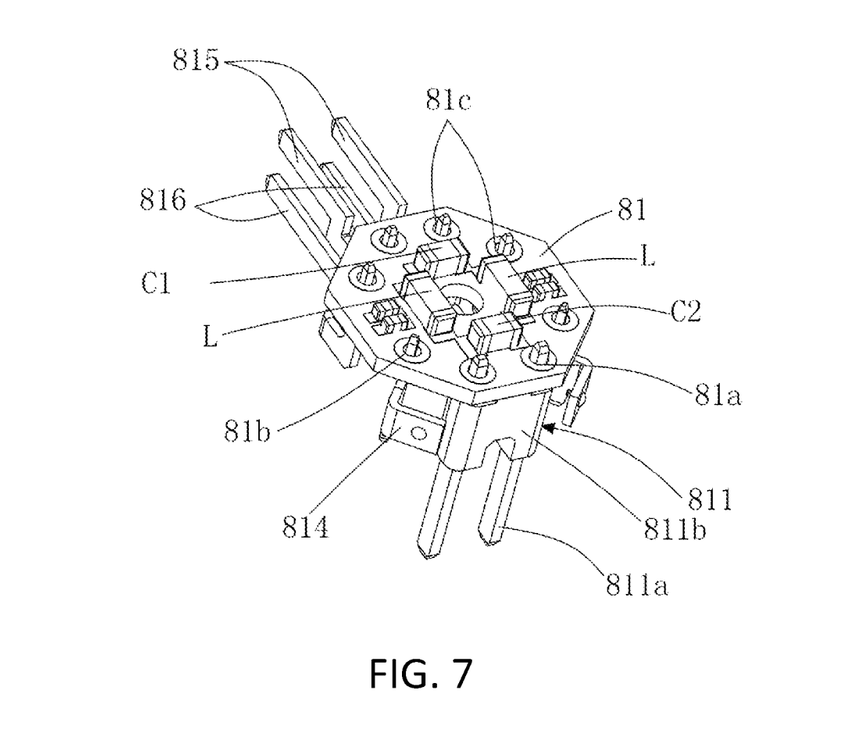
FIG. 7 illustrates a circuit board of a connector of the motor assembly of FIG. 1.

Referring to FIG. 2 and FIG. 7, the connector 60 is preferably axially mounted to the end cap 23 of the motor 10. The connector 60 includes the male plug 811 for inserting to the female socket 231 of the end cap 23. In the embodiment, the connector 60 has a first insulating housing 61 which is substantially cuboid, a second insulating housing 80 which is substantially columnar, and a metal casing 90 covering and surrounding the second insulating housing 80. The first insulating housing 61 may be connected to a radially periphery of the second insulating housing 80. Preferably, the first insulating housing 61 and the second insulating housing 80 are integrally formed as one piece. Two power terminals 815 for connecting an external power source and at least one signal terminal 816 are disposed in the first insulating housing 61. A circuit board 81 and the male plug 811 connected to the circuit board 81 are disposed in the second insulating housing 80. The circuit board 81 is provided with a hall sensor (not shown). Preferably, the circuit board 81 is substantially perpendicular to an axial direction of the motor 10, with a through hole (not labelled) to allow passage of the shaft 41 therethrough. A ring magnet 818 is fixed to the shaft 41 and adjacent to the hall sensor, for cooperation with the hall sensor to detect the speed and the position of the rotor 40, and so on. One end of the signal terminal 816 is connected to the circuit board 81 for receiving an output signal of the hall sensor, the other end of the signal terminal 816 extends to the first insulating housing 61 to be connected with an external connector.

The male plug 811 includes at least two second terminals 811a and an insulating base 811b for fixing the second terminals 811a. One end of the second terminal 811a is inserted into a first hole 81a of the circuit board 81 for connecting with the corresponding power terminal 815 via an wiring printed on the circuit board 81. The other end of the second terminal 811a is inserted into the female socket 231 of the end cap 23.

It should be understood that the positions of the female socket 231 and the male plug 811 can be interchanged, such as the female socket 231 may be arranged at the connector 60, and the male plug 811 may be correspondingly arranged at the end cap 23 of the motor 10. Specifically, two insertion holes may be directly formed in the circuit board 81 or two elastic terminals with clamping function may be soldered to the circuit board 81 to form a female socket, and the male plug may be directly fixed to the insulating body of the end cap 23. It also should be understood that the female socket 231 and the male plug 811 are not necessary, the circuit board 81 and the motor 10 may be connected together by wires.

Preferably, the circuit board 81 are provided with filter components, such as chip capacitors and chip inductors. The chip capacitors and the chip inductors are arranged at a side of the circuit board 81 away from the motor 10. The hall sensor is arranged at a side of the circuit board 81 adjacent to the motor 10.

The circuit board 81 is further provided with at least one grounding terminal 814. One end of the grounding terminal 814 is inserted into a second hole 81b of the circuit board 81 to connect the circuit board 81, the other end of the grounding terminal 814 contacts the metal casing 90 to achieve a grounding, preferably elastically abuts against the metal casing 90. In the illustrated embodiment, the circuit board 81 has two grounding terminals 814, respectively located at two sides of the male plug 811. One end of the power terminal 815 is inserted into a third hole 81c of the circuit board 81 to connect the circuit board 81, the other end of the power terminal 815 extends into the first insulating housing to be connected to the external power source. In the embodiment, the filter elements includes a first capacitor C1, a second capacitor C2 and two inductors L. The first capacitor C1, the second capacitor C1, and the two inductors L are arranged around the through hole of the circuit board 81. The two capacitors C1, C2 are corresponding with each other. The two inductors L are corresponding with each other.

Figure 8:
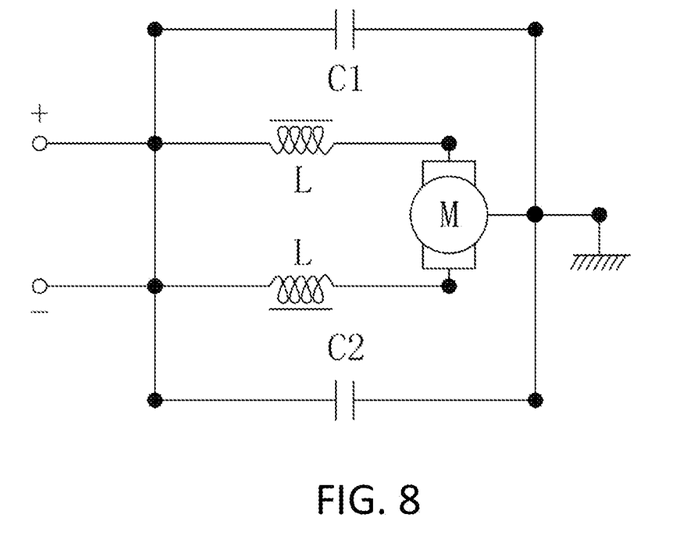
FIG. 8 is a schematic diagram of a filter circuit of the circuit board of FIG. 7.

Further referring to FIGS. 7 to 8, the first capacitor C1 is connected between one power terminal 815 and one grounding terminal 814. The second capacitor C2 is connected between the other power terminal 815 and the other grounding terminal 814. One inductor L is connected between one power terminal 815 and one of the second terminals 811a of the male plug 811. The other inductor L is connected between the other power terminal 815 and the other of the second terminals 811a of the male plug 811. Therefore, there is no need to arrange filter elements in the end cap 23, which can effectively simplify the size and the structure of the end cap 23.

Referring to FIGS. 1 to 2 again, an axial end and a peripheral surface of the second insulating housing 80 are substantially covered by the metal casing 90, so the electromagnetic interference is better shielded and the motor assembly has a higher electromagnetic compatibility level.

Preferably, a plurality of first grooves 236 are formed at intervals in an edge area of the end cap 23. The metal cover 30 has a plurality of bumps 31 corresponding to the first grooves 236. The bumps 31 cooperate with the first grooves 236 to fit the metal cover 30 to the end cap 23. The metal cover 30 also has a plurality of second grooves 32 corresponding to the bumps 31 and formed on a side of the metal cover 30 adjacent to the connector 60.

A side of the second insulating housing 80 of the connector 60 adjacent to the motor 10 includes a plurality of first protrusions 82 corresponding to the second grooves 32. The first protrusion 82 extends radially outward from the second insulating housing 80. The first protrusions 82 are respectively mounted to the corresponding second grooves 32.

The metal casing 90 has an end wall (not labelled) and a side wall 90. The end of the side wall 90 extends radially outward to form a plurality of second protrusions 91 corresponding to the first protrusions 82. The second protrusions 91 are respectively mounted to the corresponding first protrusions 82.

The open end of the stator housing 21 includes a plurality of retaining portions 212 located at the positions corresponding to the first grooves 236. Each of the retaining portions 212 is bent inwardly from the stator housing 21 to press the second protrusion 91, thereby clamping the metal cover 30, the second insulating housing 80 and the metal casing 90 between the first groove 236 and the retaining portion 212.

In the illustrated embodiment, the second insulating housing 80 and the metal casing 90 have a cross section smaller than a cross section of the stator housing 21, thereby leaving space to form the first protrusion 82 and the second protrusion 91. Both of the metal casing 90 and the second insulating housing 80 are substantially prismatic shaped, with a polygonal, preferably octagonal cross section. It should be understood that the cross section of the second insulating housing 80 and the metal casing 90 may also be other shaped, such as a circular, a quadrate, or a hexagonal. Preferably, both the metal cover 30 and the metal casing 90 contact and electrically connect to the stator housing 21.

The motor assembly of the present disclosure is not limited to the embodiment described above. The first insulating housing 61 and the terminals 815, 816 housed therein are not necessary to be formed on the connector 60, as the connection structure for connecting the external power source may also be formed on the motor 10. Under this condition, the connector 60 may be replaced by a filter unit with the second insulating housing 80 and the circuit board 81 arranged in the second insulating housing 80. The filter unit preferably further includes the metal casing 91.

The motor assembly of the present disclosure is not limited to the embodiment described above. The connector 60 may also be mounted to the motor 10 along the radial direction or other directions. The first insulating housing 61 and the second insulating housing 80 of the connector 60 may also have other shapes. The first insulating housing 61 may be arranged on the second insulating housing 80 along the axial direction. The circuit board 81 also may be placed substantially parallel to the axial direction.

In the embodiments of the present disclosure, the motor 10 and the filter unit are separate, so the filter unit can be selectively mounted to the motor 10 or not according to the demands of the different customers on the electromagnetic compatibility level of the motor assembly 100. Besides, the filter unit has a simply structure as it has less components than the current end cap, the production cost of customizing different filter units will be lower than the production cost of customizing different current end caps. Therefore, the motor assembly of the present disclosure is more flexible to meet the needs of different customers.

Referring to FIGS. 9 to 12, a motor assembly according to an alternative embodiment of the present disclosure is provided, which includes a stator 101 and a rotor 15 rotatable relative to the stator 101. The rotor 15 includes a shaft 11, an armature 16 and a commutator 17 fixed to the shaft 11. The stator 101 includes a stator housing 12, at least one magnet 14 attached to an inner surface (not labelled) of the stator housing 12, and an end cap mounted to an outside of the stator housing 12. The end cap includes an end cap housing 23 substantially in the form of a hollow cylinder, a connector housing 26 integrally formed with the end cap housing 23, and a metal casing 231. The metal casing 231 substantially covers one axial end of the end cap housing 23 and surrounds a peripheral surface of the end cap housing 23, so the electromagnetic interference is better shielded and the motor assembly can reach a high electromagnetic compatibility level. Preferably, the metal casing 231 contacts and electrically connects the stator housing 12, with a shape substantially corresponding to the end cap housing 23.

Figure 9:
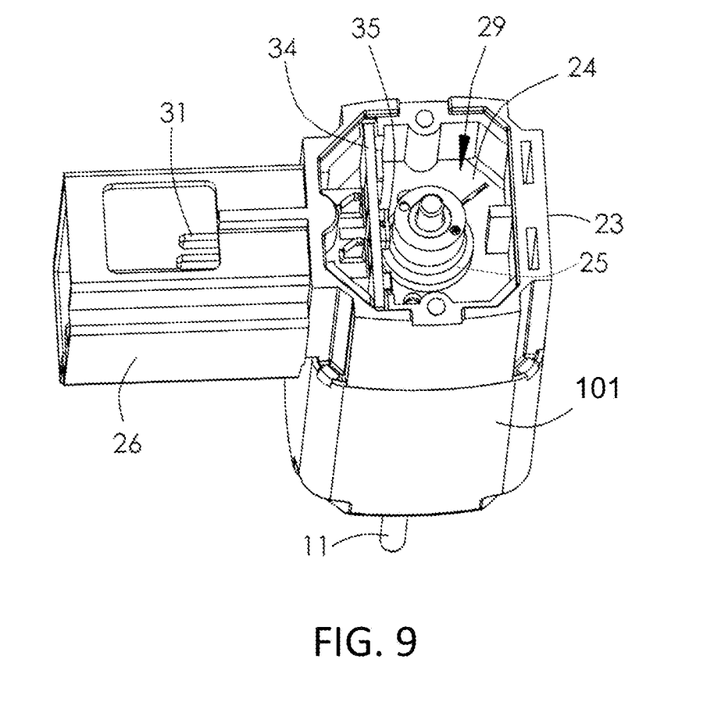
FIG. 9 is a perspective view of a motor assembly according to an alternative embodiment of the present disclosure, with a metal casing removed to show an interior structure of an end cap.
Figure 10:
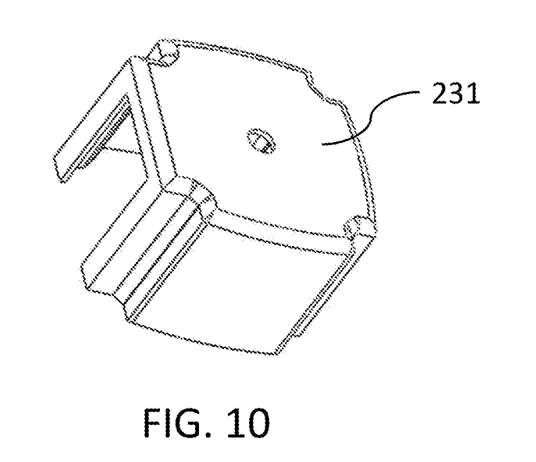
FIG. 10 is a perspective view of the metal casing of the motor assembly of FIG. 9.
Figure 11:
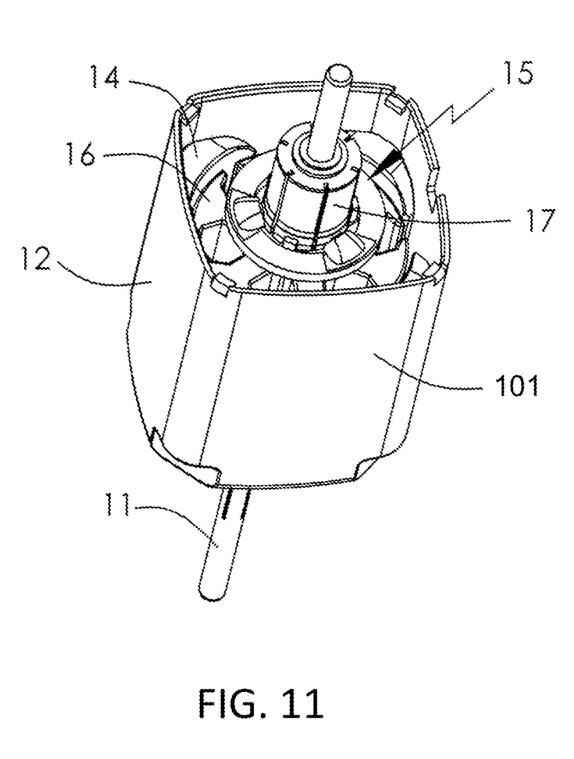
FIG. 11 is a perspective view of the motor assembly of FIG. 9, with the end cap removed.
Figure 12:
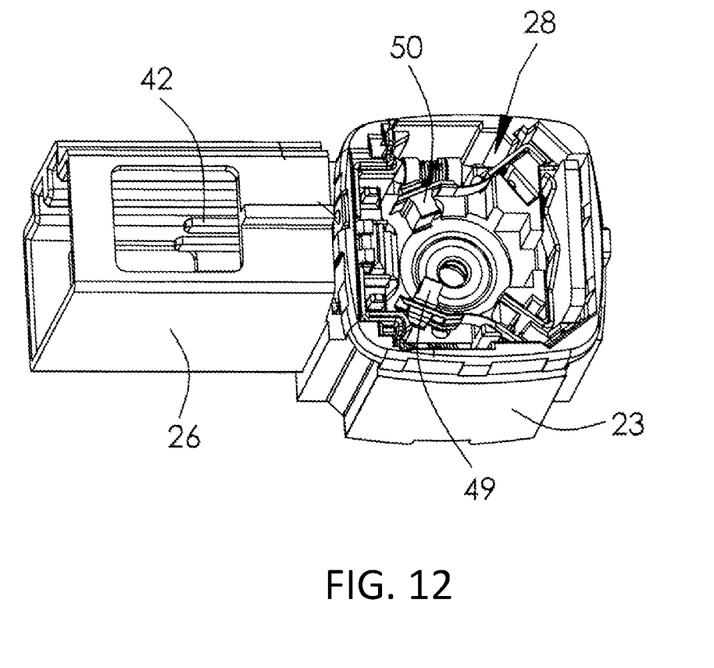
FIG. 12 is a perspective view of the end cap of the motor assembly of FIG. 9, viewed from below.

A support plate 24 is integrally formed in the end cap housing 23 to divide an interior space thereof into a first cavity 28 facing the stator housing 12, and a second cavity 29 remote from the stator housing 12. At least two brushes 49, 50 are mounted in the first cavity 28 of the end cap housing 23. A bearing 25 is mounted to the support plate 24. A plurality of filter elements, such as capacitors or inductors, are arranged in the connector housing 26.

Two power terminals 42 extend into the first cavity 28 of the end cap housing 23 and are electrically connected to the brushes 49 and 50, respectively, to supply power to the motor.

A circuit board 34 with a hall sensor 35 mounted thereon may be installed in the second cavity 29 of the end cap housing 23. The filter elements are preferably arranged on the circuit board 34. Another two signal terminals 31 may be formed in the connector housing 26, extend into the second cavity 29 of the end cap housing 23 and are electrically connected to the circuit board 34, to supply power to the circuit board 34 and to receive feedback signals from the hall sensor 35.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. A motor assembly, comprising a motor having a stator and a rotor rotatable relative to the stator,
wherein the motor assembly further comprises a filter unit mounted to an outside of the motor, and the filter unit comprises an insulating housing and at least one filter element arranged in the insulating housing and electrically connected to the motor;
one of the filter unit and the motor has a female socket and the other has a male plug, and the filter unit and the motor are electrically connected together by the female socket and the male plug;
the stator comprises a stator housing with an open end and a metal cover mounted to the open end of the stator housing, and the stator further comprises an end cap arranged at an inner side of the metal cover, and the end cap is provided with at least two brushes.

2. The motor assembly according to claim 1, wherein the filter unit further comprises a circuit board, and the at least one filter element is arranged on the circuit board.

3. The motor assembly according to claim 2, wherein the filter unit further comprises a metal casing which covers one axial end of the insulating housing and substantially surrounds a peripheral surface of the insulating housing.

4. The motor assembly according to claim 3, wherein the circuit board is provided with at least one grounding terminal contacting the metal casing.

5. The motor assembly according to claim 3, wherein the metal cover and the metal casing contact and electrically connect the stator housing.

6. The motor assembly according to claim 1, wherein the filter unit is mounted to the motor along an axial direction of the motor.

7. The motor assembly according to claim 3, wherein the end cap comprises at least two brush holders for accommodating the at least two brushes, and the brushes and the female socket or the male plug of the motor are arranged at opposite sides of a shaft of the rotor.

8. The motor assembly according to claim 3, wherein a plurality of first grooves are formed at intervals in an edge area of the end cap, the metal cover has a plurality of bumps, the insulating housing of the filter unit has a plurality of first protrusions, the metal casing has a plurality of second protrusions, the stator housing has a plurality of retaining portions corresponding to the first grooves, the retaining portions are bent inwardly from the stator housing to clamp the bumps, the first protrusions and the second protrusions between the first grooves and the retaining portions.

9. The motor assembly according to claim 3, wherein the filter unit further comprises two power terminals for connecting an external power source and a connector housing for fixing the two power terminals.

10. The motor assembly according to claim 9, wherein the insulating housing of the filter unit is substantially columnar, the connector housing is substantially cuboid, and the two power terminals extend into the insulating housing to connect the circuit board.

11. The motor assembly according to claim 10, wherein the insulating housing and the metal casing have a cross section smaller than a cross section of the stator housing.

12. The motor assembly according to claim 9, wherein the circuit board is provided with a hall sensor, the filter unit further comprises at least one signal terminal fixed by the connector housing, and the at least one signal terminal extends to into the insulating housing to connect the circuit board, for receiving an out signal of the hall sensor.

13. A motor assembly, comprising a motor having a stator and a rotor rotatable relative to the stator,
wherein the motor assembly further comprises a filter unit mounted to an outside of the motor, and the filter unit comprises an insulating housing and at least one filter element arranged in the insulating housing and electrically connected to the motor;
the filter unit further comprises a metal casing which covers one axial end of the insulating housing and substantially surrounds a peripheral surface of the insulating housing;
the stator comprises a stator housing with an open end, the insulating housing and the metal casing have a cross section smaller than a cross section of the stator housing.

14. A motor assembly, comprising a motor having a stator and a rotor rotatable relative to the stator,
wherein the motor assembly further comprises a filter unit mounted to an outside of the motor, and the filter unit comprises an insulating housing and at least one filter element arranged in the insulating housing and electrically connected to the motor;
one of the filter unit and the motor has a female socket and the other has a male plug, and the filter unit and the motor are electrically connected together by the female socket and the male plug;
the filter unit further comprises a circuit board, and the at least one filter element is arranged on the circuit board, the filter unit further comprises a metal casing which covers one axial end of the insulating housing and substantially surrounds a peripheral surface of the insulating housing, the circuit board is provided with at least one grounding terminal contacting the metal casing.

* * * * *